(12) United States Patent
Ulcej et al.

(10) Patent No.: US 7,074,030 B2
(45) Date of Patent: Jul. 11, 2006

(54) SCRAPING ASSEMBLY FOR AN EXTRUSION DIE AND METHOD OF USE THEREFOR

(75) Inventors: John A. Ulcej, Colfax, WI (US); Dale P. Pitsch, Jim Falls, WI (US)

(73) Assignee: Extrusion Dies Industries, LLC., Chippewa Falls, WI (US)

( * ) Notice: Subject to any disclaimer, the term of this patent is extended or adjusted under 35 U.S.C. 154(b) by 271 days.

(21) Appl. No.: 10/252,632

(22) Filed: Sep. 23, 2002

(65) Prior Publication Data

US 2004/0056373 A1    Mar. 25, 2004

(51) Int. Cl.
 *B29C 47/92*    (2006.01)
(52) U.S. Cl. ............... 425/226; 425/227; 425/229; 425/381
(58) Field of Classification Search ........ 425/225, 425/226, 227, 228, 229, 230, 231, 232, 465, 425/466, 381, 382.4; 264/177.1, 177.11
See application file for complete search history.

(56) References Cited

U.S. PATENT DOCUMENTS

| | | | |
|---|---|---|---|
| 2,488,830 A | 11/1949 | Redington | 18/12 |
| 2,671,417 A | 3/1954 | Jacobsen | 425/215 |
| 3,018,515 A | 1/1962 | Sneddon | 425/466 |
| 3,323,169 A | 6/1967 | Vitellaro | 18/12 |
| 3,502,757 A | 3/1970 | Spencer | 264/556 |
| 3,804,569 A | 4/1974 | Walker | 425/225 |
| 4,248,579 A | 2/1981 | Maejima | 425/227 |
| 4,296,517 A | 10/1981 | Böhler | 15/93.1 |
| 4,354,593 A | 10/1982 | Diedrich | 198/718 |
| 5,391,071 A | 2/1995 | Hazarie et al. | 425/135 |
| 5,494,429 A | 2/1996 | Wilson et al. | 425/192 R |
| 5,505,609 A * | 4/1996 | Cloeren et al. | 425/381 |
| 5,511,962 A | 4/1996 | Lippert | 425/141 |
| 6,017,207 A | 1/2000 | Druschel | 425/141 |
| 6,164,948 A * | 12/2000 | Cook | 425/186 |

FOREIGN PATENT DOCUMENTS

| | | |
|---|---|---|
| JP | 08150651 | 6/1996 |
| JP | 2000289081 | 10/2000 |

OTHER PUBLICATIONS

European Search Report, Application No. EP 03292324, dated Feb. 2, 2005.

* cited by examiner

*Primary Examiner*—Joseph S. Del Sole
(74) *Attorney, Agent, or Firm*—McCracken & Frank LLP

(57) ABSTRACT

An apparatus for scraping a lip of an extrusion die includes a scraping surface pressed against the lip. The scraping surface is movable along the lip of the die to clean debris, such as hardened thermoplastic, from the surface of the lip. The scraping surface may be removable and/or replaceable. A method of cleaning the extrusion die includes pressing the scraping surface against the lip of the extrusion die and traversing the scraping surface along the lip in a controlled manner.

40 Claims, 17 Drawing Sheets

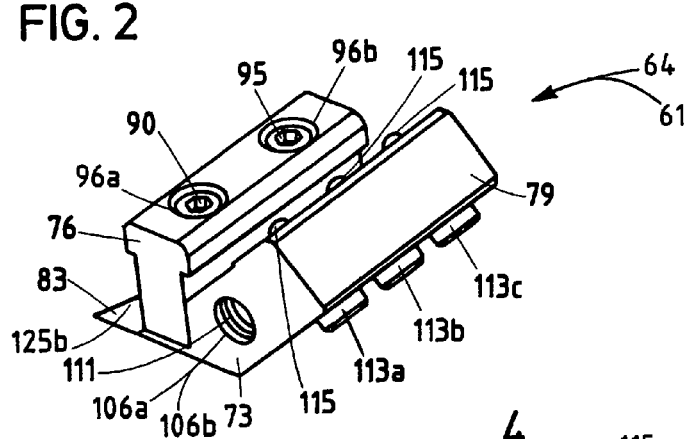
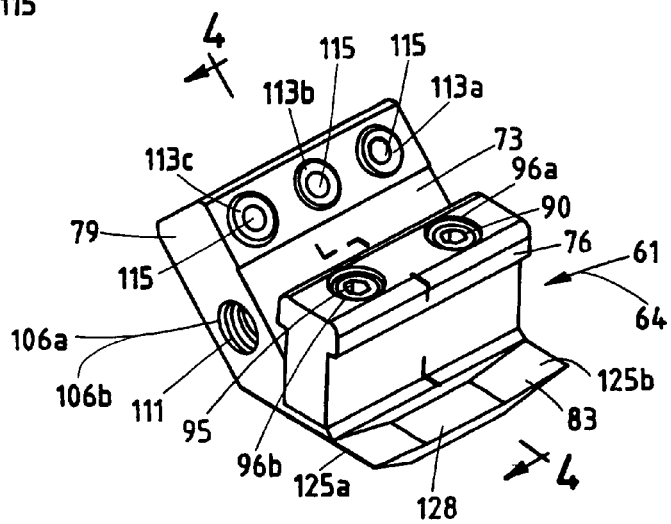
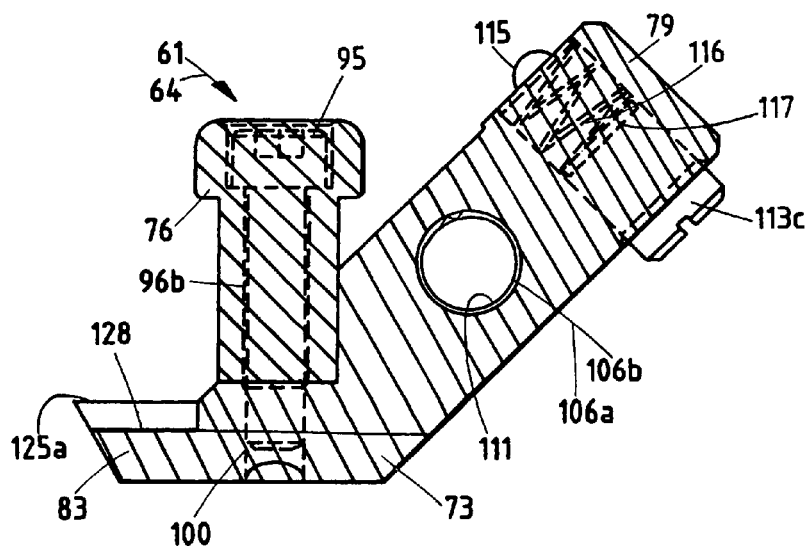

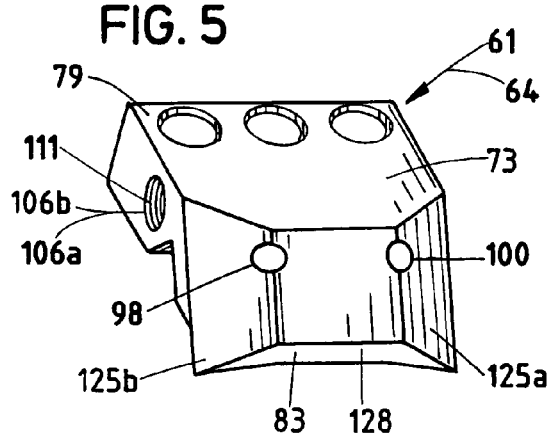
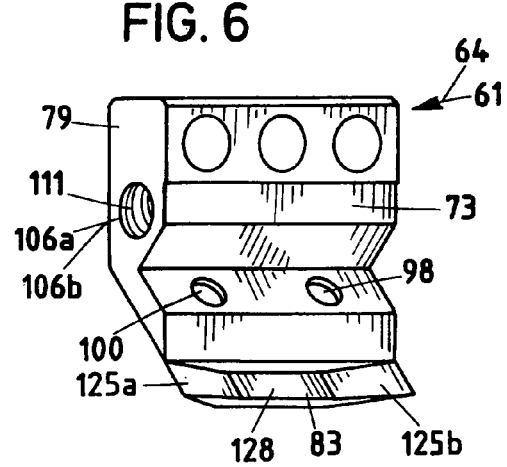
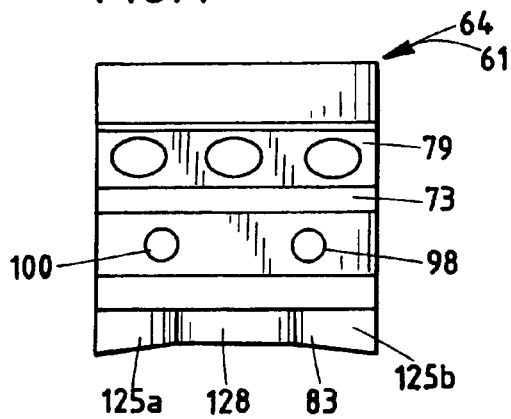

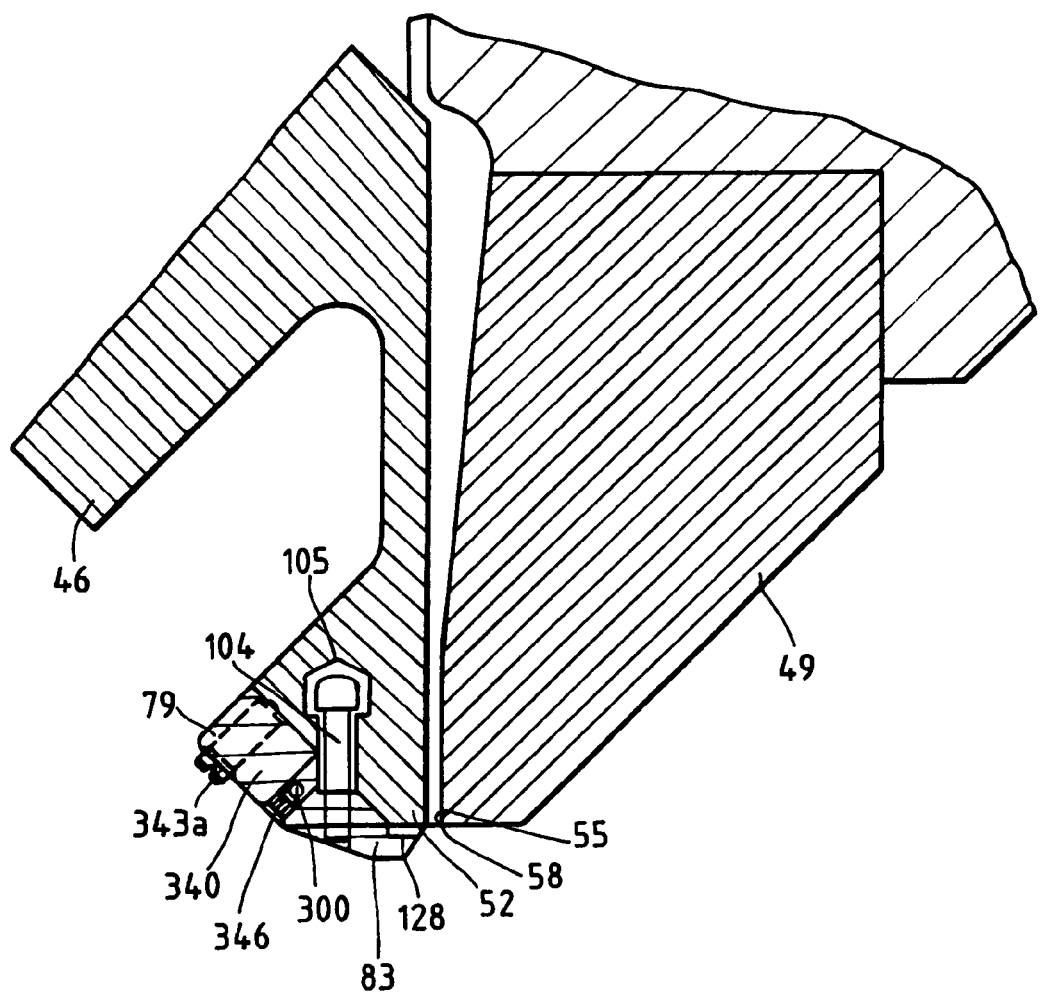

SCRAPING ASSEMBLY FOR AN EXTRUSION DIE AND METHOD OF USE THEREFOR

TECHNICAL FIELD

The present invention relates generally to extrusion dies, and, more particularly, to a lip scraping assembly for an extrusion die and a method of use therefor.

BACKGROUND ART

Extrusion dies are used to form a desired product out of heated, molten thermoplastic material. The extrusion die is fed with the material at an inlet of the die and produces the desired product at an outlet of the die. The outlet has a shape that is a cross sectional profile of the final product.

Flat sheet extrusion dies typically comprise two or more die bodies that are secured together, thereby defining an outlet between a lip of each die body. An example of this type of extrusion die is disclosed in commonly-assigned Wilson et al. U.S. Pat. No. 5,494,429, which describes a two-piece die body that forms a sheet of substantially uniform thickness.

During extrusion, the thermoplastic sheet exiting the outlet is still in a heated state, and as such, may emit small quantities of vapor or liquid that can cool, harden, and become affixed to either of the die lips in a manner somewhat analogous to the formation of an icicle. This hardened and affixed thermoplastic is sometimes referred to as bearding because the hardened thermoplastic may resemble whiskers extending from the lips of the die into the path of the extruded material exiting the die outlet. This bearding is undesirable because it tends to scrape against the extruded material, thereby creating die lines on the material. As a result, attempts have been made in the art to prevent accumulation of bearding on the die lips without having to manually scrape away such bearding. For example, Spencer U.S. Pat. No. 3,502,757 discloses an air sweep nozzle 22 that extends across roughly the entire width of the die. The nozzle 22 blows air toward one of the die lips to reduce or entirely eliminate build-up of material (i.e., bearding). Hazarie et al. U.S. Pat. No. 5,391,071 discloses an apparatus for cleaning first and second lips 22, 24 of a casting die that produces a thin polymeric film. Solvent nozzles 28 and 34 are disposed near the respective lips 22 and 24, and, upon detection of agglomerations of polymer on the lip, the nozzles 28 and 34 traverse the width of the die directing a stream of solvent at the lips 22, 24 to wash away any such agglomerations.

While numerous prior art dies incorporate cleaning apparatus that direct air or liquid at die lips to wash away debris, no known attempts have been made in the art to provide a lip cleaning apparatus having a scraping surface pressed against a lip of an extrusion die that scrapes debris off of the lip.

SUMMARY OF THE INVENTION

In accordance with one aspect of the present invention, an extrusion die includes a die body having a lip. A scraping surface is pressed against the lip. The scraping surface is movable along the lip by a moving assembly.

In accordance with a further aspect of the present invention, an apparatus for scraping a lip of an extrusion die includes a scraping surface. The scraping surface is adapted for scraping the lip when the scraping surface is pressed against the lip and moved therealong by a moving assembly.

A further aspect of the present invention comprehends a method of cleaning an extrusion die. The method includes the steps of pressing a scraping surface against a lip of the die and moving the scraping surface by a moving assembly along the lip.

A still further aspect of the present invention comprises an assembly for an extrusion die. The assembly includes a guide member disposed in a channel of the die. A scraping surface is pressed against a lip of the die. A rod is connected to the die, and the scraping assembly is movable along the lip. A drive shaft is capable of rotating the rod to move the scraping assembly along the rod.

A further aspect of the present invention comprehends a lip scraping assembly for scraping a lip of an extrusion die. The lip scraping assembly includes a scraping surface adapted for scraping the lip when the scraping surface is pressed against the lip and moved by a moving assembly along the lip. The scraping surface is removable from the scraping assembly.

Another aspect of the present invention comprehends a scraping insert for a lip scraping assembly. The scraping assembly is adapted for use with an extrusion die. The insert includes an edge member adapted for scraping a lip of the extrusion die. The insert is attachable to or removable from the scraping assembly.

Other aspects and advantages of the present invention will become apparent upon consideration of the following detailed description.

BRIEF DESCRIPTION OF THE DRAWINGS

FIGS. 2 and 3 are enlarged isometric views of one of the lip scraping assemblies, the other assembly being identical thereto;

FIG. 4 is a sectional view of the lip scraping assembly taken generally along lines 4—4 of FIG. 3;

FIG. 5 is a front isometric view of the lip scraping assembly of FIGS. 2–4, but with the guide member and canting screws removed therefrom;

FIG. 6 is a rear isometric view of the assembly of FIG. 5;

FIG. 7 is a rear elevational view of the assembly of FIG. 5;

FIG. 22 is a fragmentary sectional view of a still further alternate embodiment illustrating a dissimilarly shaped channel and guide member.

DESCRIPTION OF THE PREFERRED EMBODIMENTS

Figure 1:
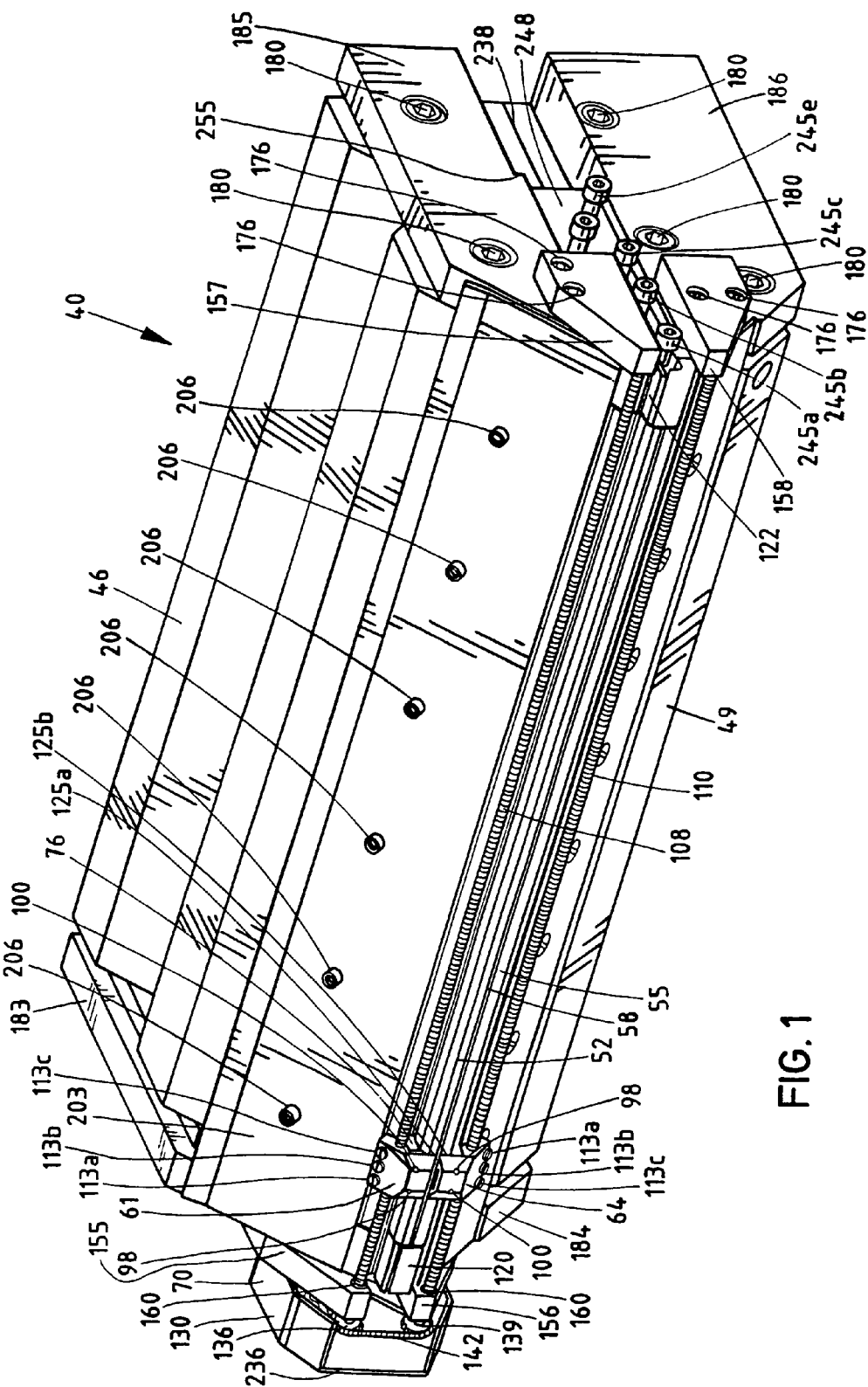
FIG. 1 is a front isometric view of an extrusion die incorporating lip scraping assemblies.

An extrusion die 40 includes first and second die bodies 46 and 49, each including a lip 52 and 55, respectively, that together define a die outlet 58 from which a flat sheet (not shown) of thermoplastic material exits in a continuous fashion. The die 40 includes first and second identical lip scraping assemblies 61 and 64 and a moving assembly 70 that is capable of moving the scraping assemblies 61, 64 along the lips 52, 55, respectively, to clean debris therefrom.

Figure 9:
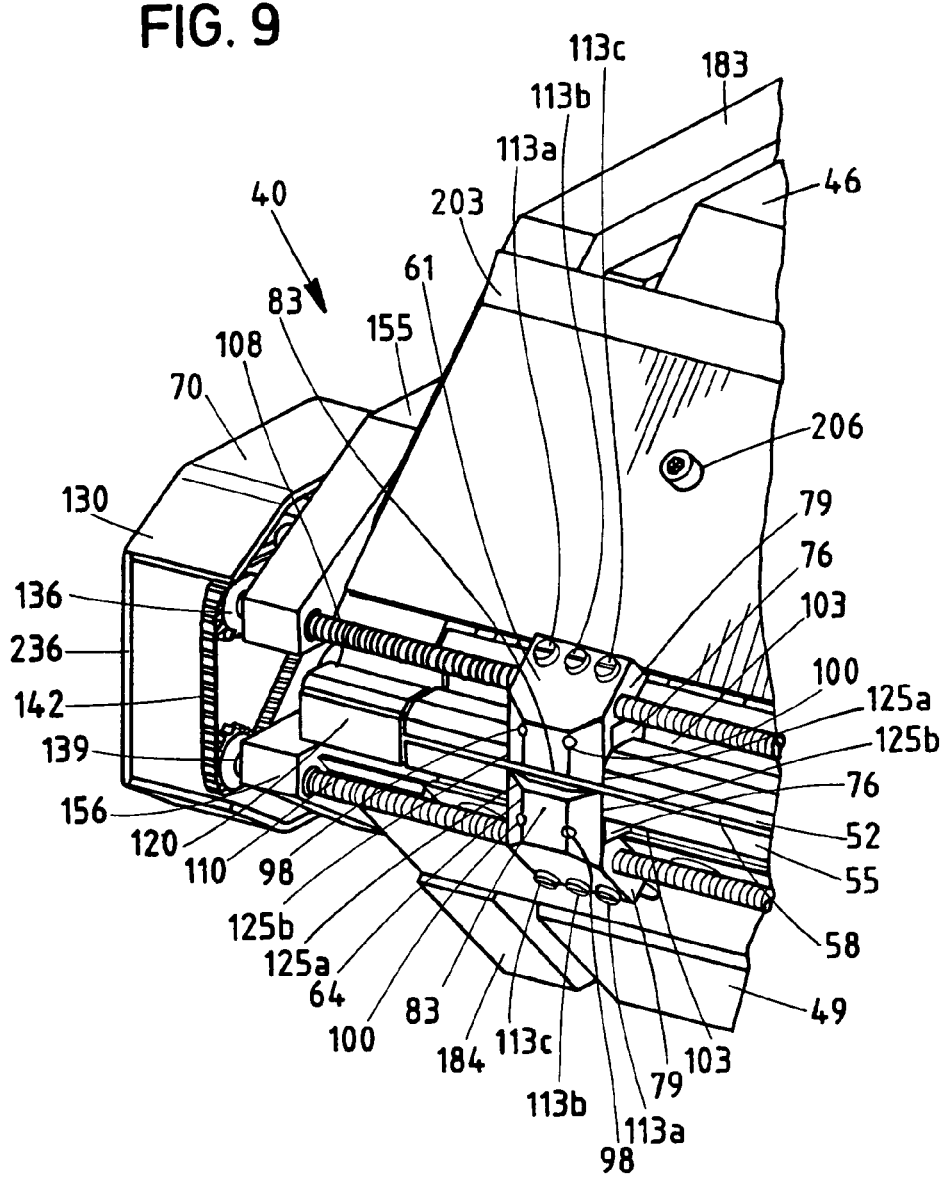
FIG. 9 is an enlarged, fragmentary, isometric view of the extrusion die of FIG. 1.
Figure 21:
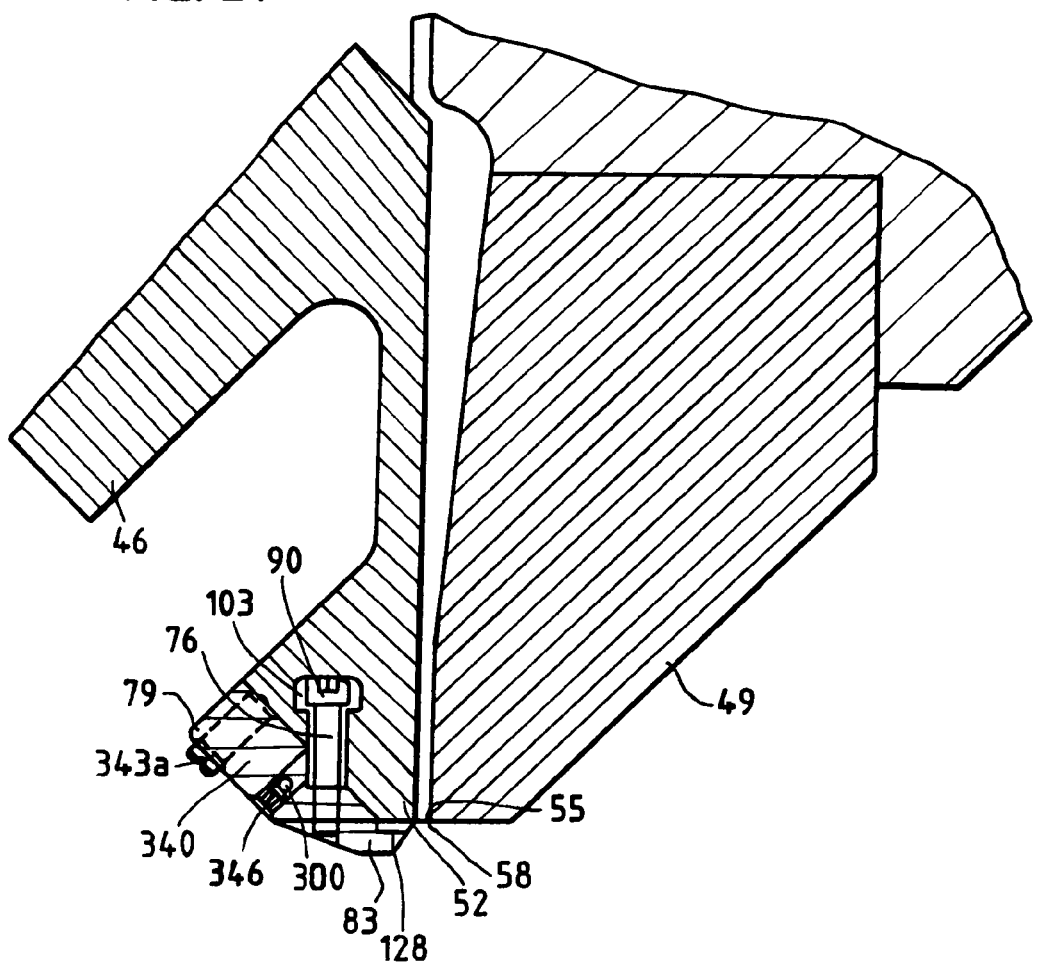
FIG. 21 is a fragmentary sectional view of the die taken generally along lines 21—21 of FIG. 18.

Each of the scraping assemblies 61, 64 (FIGS. 2–7) includes a body member 73 and a T-shaped guide member 76. The body member 73 includes a lever end 79 and a scraping end 83. The guide member 76 is secured to the body member 73 by threaded bolts 90, 95 that extend through bores 96a, 96b in the guide member 76 and extend further into aligned bores 98, 100 (FIGS. 4–7) of the body member 73. Each of the guide members 76 is slidably retained in a channel 103 (FIGS. 9, 12C, 21), disposed in each of the die bodies 46, 49. The guide members 76 and the channels 103 may have any similar or dissimilar cooperating shape(s) to slidably retain the guide member 76 therein. For example, the guide member 76 and the channel 103 may have complementary circular or triangular cross-sectional shapes (not shown). Alternatively, the guide member 76 could be replaced with a circular guide member 104 (FIG. 22) and the channel 103 could be replaced with a triangular channel 105, dissimilar in shape to the guide member 104. The specific shape of the guide member 76 and the channel 103 is not important. It is important that the channel 103 holds the guide member 76 within the channel 103 such that the guide member 76 can slide smoothly within the channel 103 and the guide member 76 is retained within the channel 103. Each of the scraping assemblies 61, 64 further includes a threaded bore 106a, 106b (e.g., FIG. 4), respectively, through which first and second threaded rods 108, 110 (FIG. 1), respectively, extend. The threads of the rods 108, 110 engage with threads 111 of the bores 106. First through third canting screws 113a–113c are disposed in the lever end 79 of the body member 73. Tightening of the canting screws 113 cants the scraping ends 83 toward the die lips 52, 55, thereby pressing the scraping ends 83 against the lips 52, 55. In this regard, each of the canting screws 113 includes a ball 115 that presses against the die bodies 46, 49 when the screws 113 are tightened. A steel compression spring 116 (shown in phantom in FIG. 4) is coiled around each of the screws 113. A locking nut or other insert 117 is disposed partway down the length of each of the screws 113 to compress the springs during tightening. The smooth surface and resilient bias of the balls 115 and the fulcrum action provided by the T-shaped guide member 76 allow the scraping assemblies 61, 64 to glide along the surface of the die bodies 46, 49 from a first docking station 120 to a second docking station 122 while exerting a resilient biasing force against the die lips 52, 55, as described in greater detail hereinafter. The screws 113 are available from McMaster-Carr Supply Company of Elmhurst, Ill. It should be noted that while the canting screws 113 are preferred, any manner of pressing the scraping ends 83 against the die lips 52, 55 is acceptable. For example, the scraping ends 83 could be pressed by a simple mechanical arm (not shown) that is not attached to the die 40 and moves synchronously with the assemblies 61, 64 across the die 40. The scraping ends 83 are beveled and terminate at first and second sharp scraping edges 125a, 125b. Beveling the edges 125 leaves a recess 128 therebetween. Providing the recess 128 reduces surface contact in the center of the scraping end 83, thereby concentrating scraping force at the scraping edges 125a, 125b. However, it should be noted that the scraping ends 83 can be shaped and sharpened in any suitable shape or manner to effectively scrape debris from the die lips 52, 55. For example, although the edges 125 are illustrated as being perpendicular to the outlet 58, the edges 125 could alternatively be disposed at angles other than 90° with respect to the outlet 58.

The moving assembly 70 includes a chain housing 130 and first through third sprockets 133, 136, 139 (FIGS. 11, 12) connected by a chain 142 that can be formed of any suitable material such as stainless steel. A drive shaft 145 includes a hex-end 146 and extends from the sprocket 133. The drive shaft 145 may be rotated in any suitable manner, such as by actuating a variable speed drill (not shown), the chuck of which is tightened around the hex-end 146. However, the drive shaft 145 could also be actuated by a dedicated bidirectional motor (not shown). The effect of rotating the drive shaft 145 is described in greater detail hereinafter.

Figure 13:
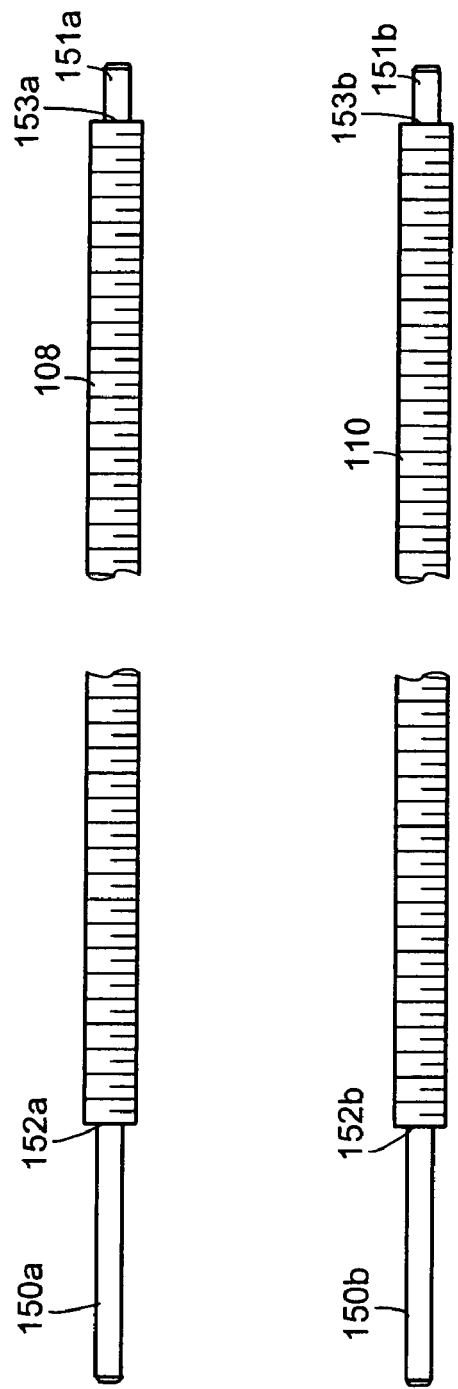
FIG. 13 provides fragmentary elevational views of the threaded rods.
Figure 14:
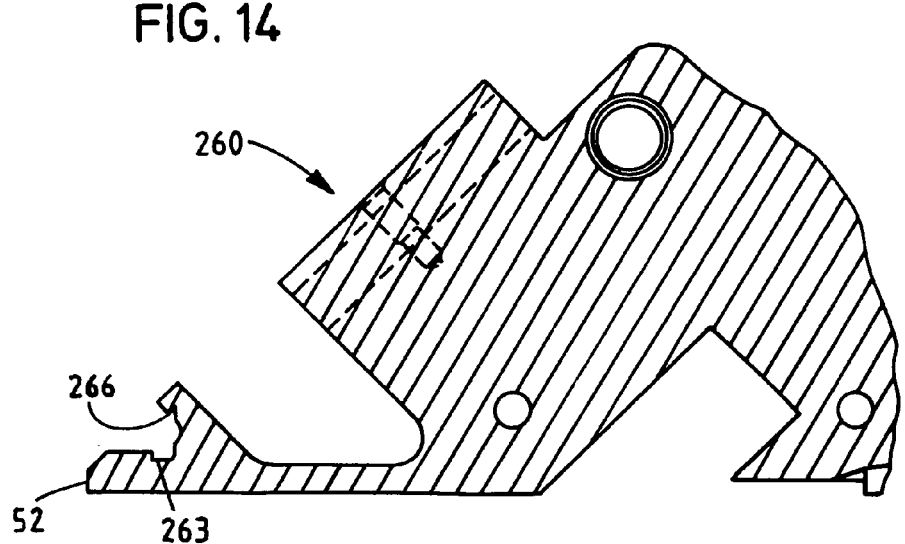
FIG. 14 is an enlarged fragmentary sectional view an alternate die body.
Figure 15:
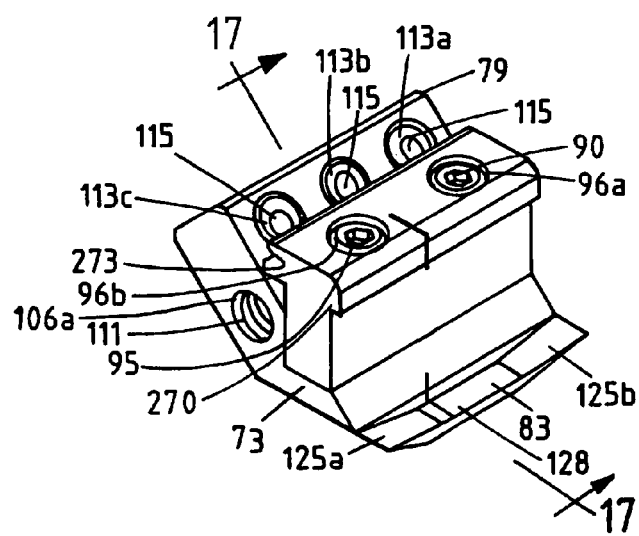
FIGS. 15 and 16 are isometric views of an alternate lip scraping assembly adapted for use with the die body of FIG. 14.
Figure 16:
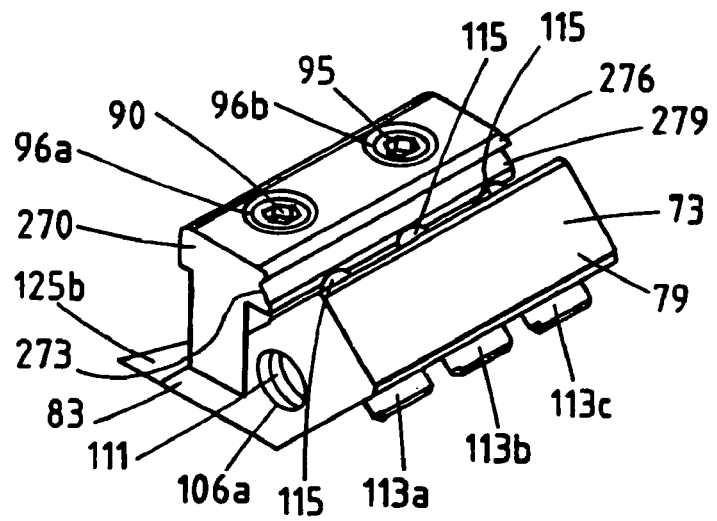
Figure 17:
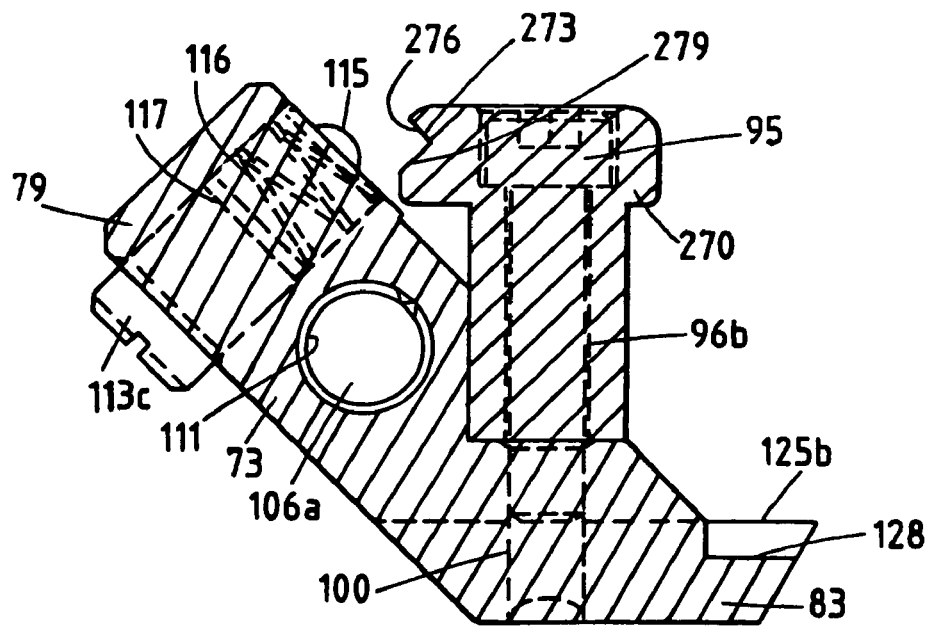
FIG. 17 is a sectional view of the alternate lip scraping assembly taken generally along lines 17—17 of FIG. 15.
Figure 18:
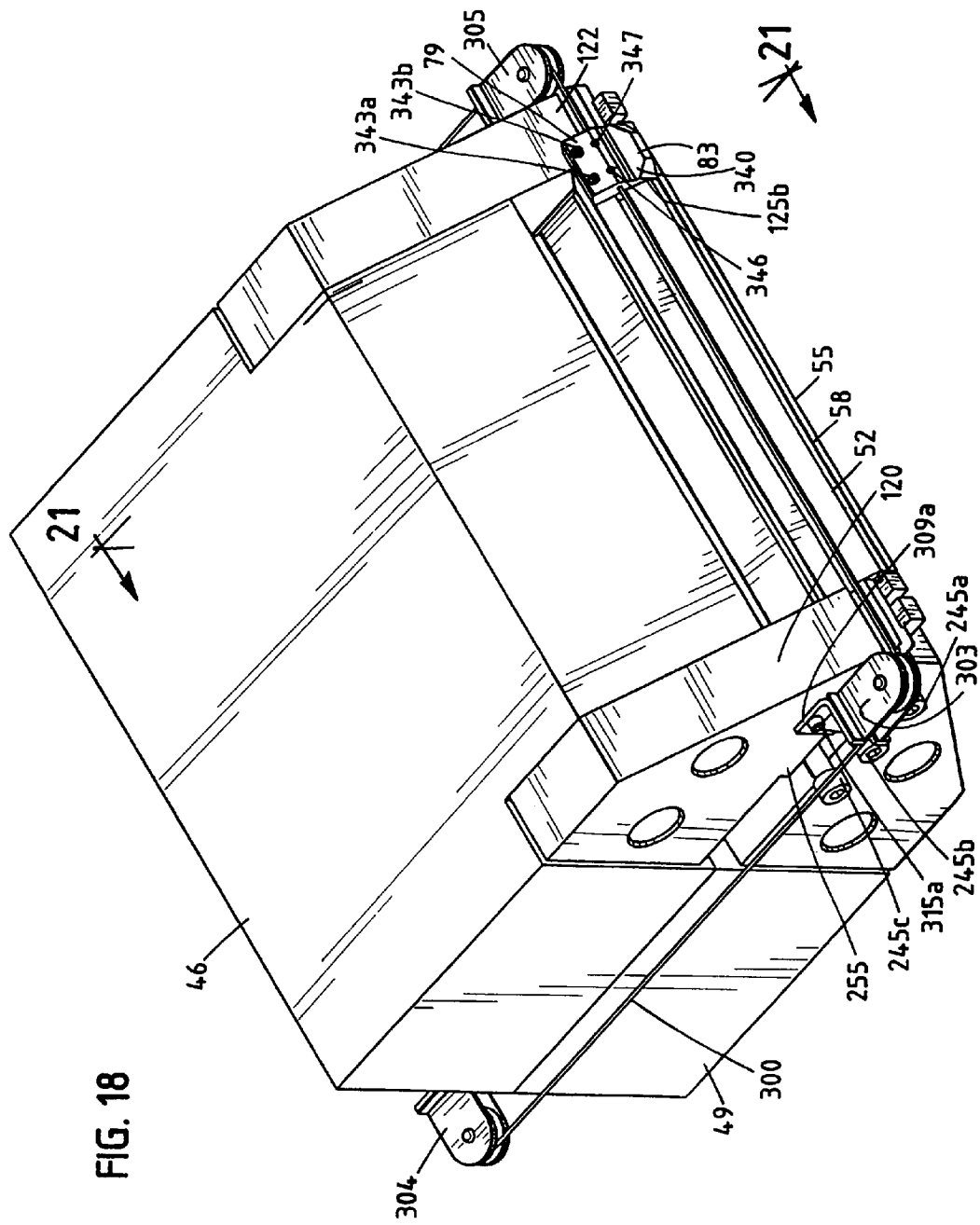
FIG. 18 is an isometric view of a second alternative embodiment of a lip scraping assembly utilizing an alternative cable and pulley apparatus.
Figures 19, 20:
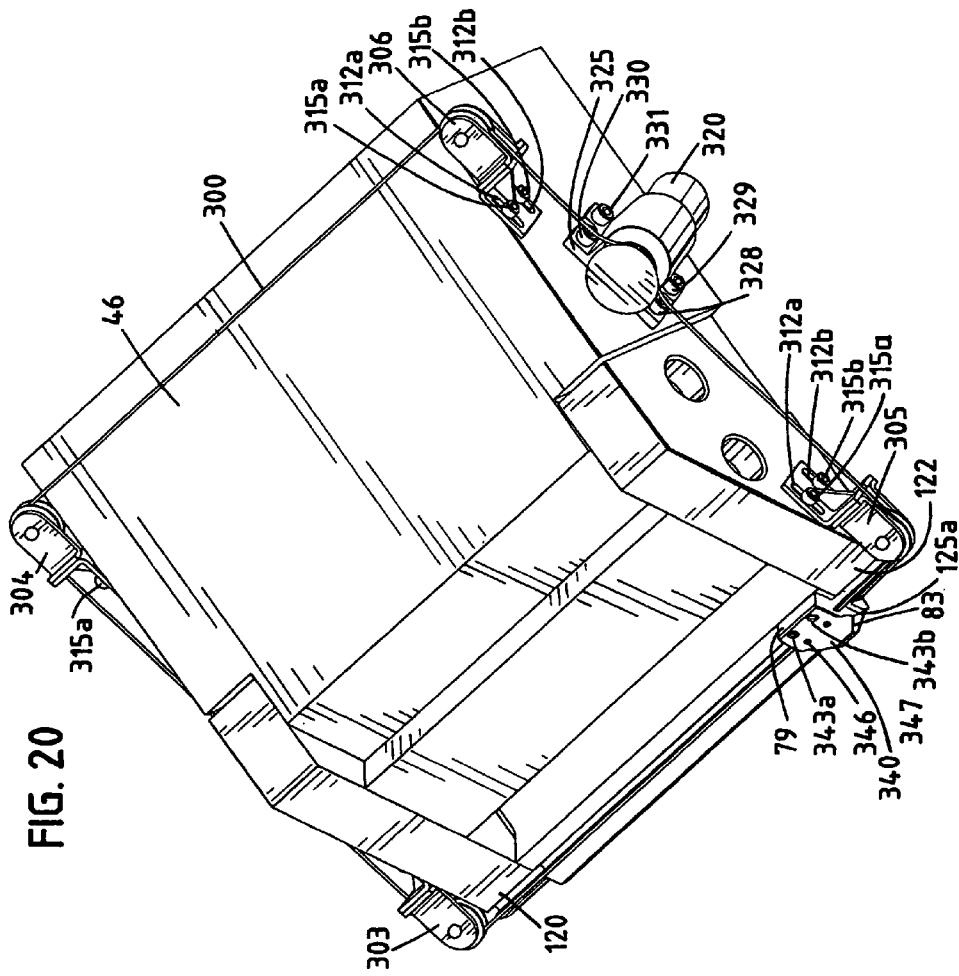
FIGS. 19 and 20 are end elevational and isometric views, respectively, of the first die body of the die of FIG. 17.

Referring to FIG. 13, each of the rods 108, 110 includes a first unthreaded reduced diameter end 150a, 150b, respectively, and a second unthreaded reduced diameter end 151a, 151b, respectively. Rod shoulders 152a, 152b are disposed adjacent the ends 150a, 150b, respectively, while rod shoulders 153a, 153b are disposed adjacent the ends 151a, 151b, respectively.

Figure 12A:
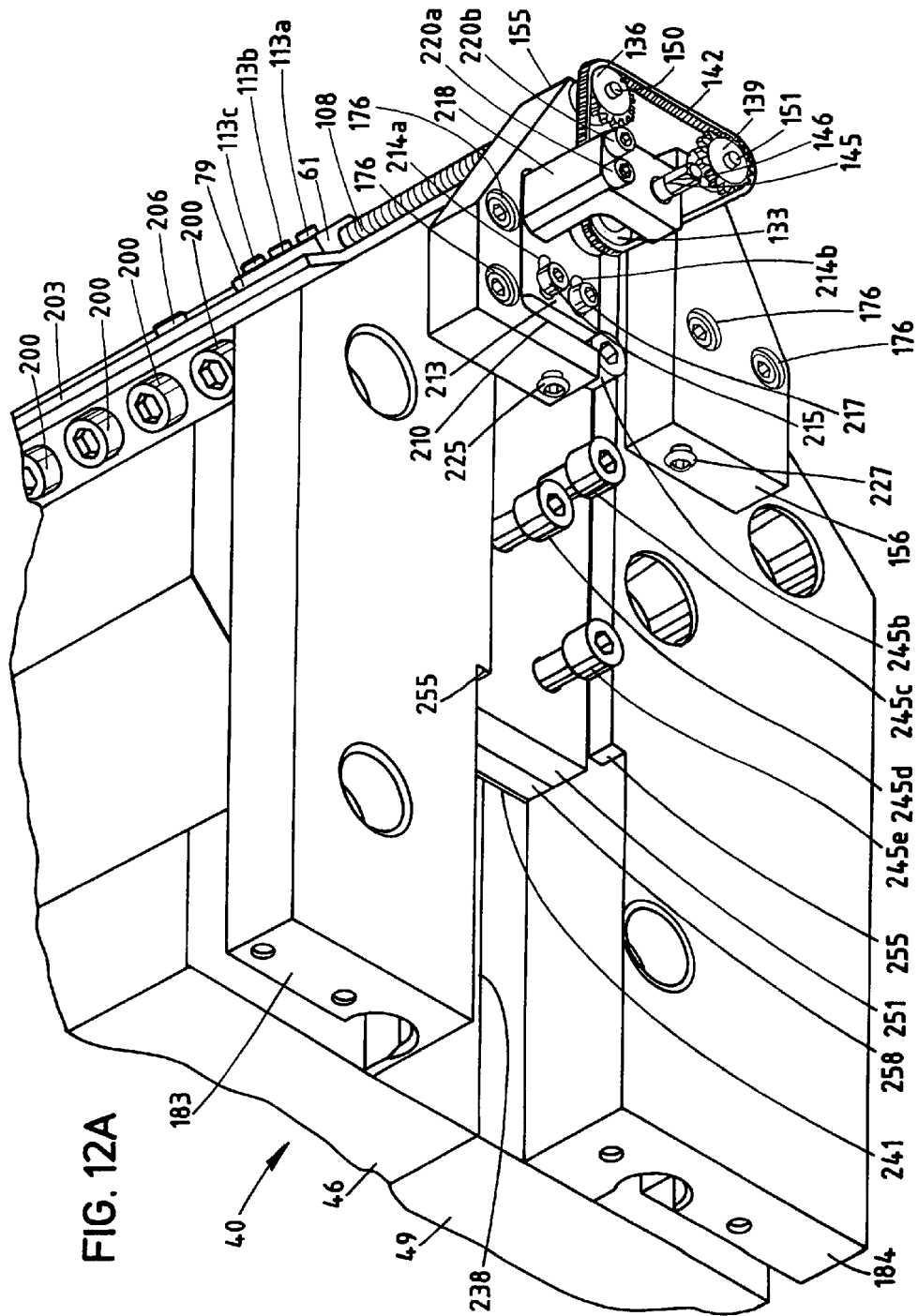
FIG. 12A is an enlarged, fragmentary, isometric view of the extrusion die of FIG. 1 looking from one side and above.
Figure 12B:
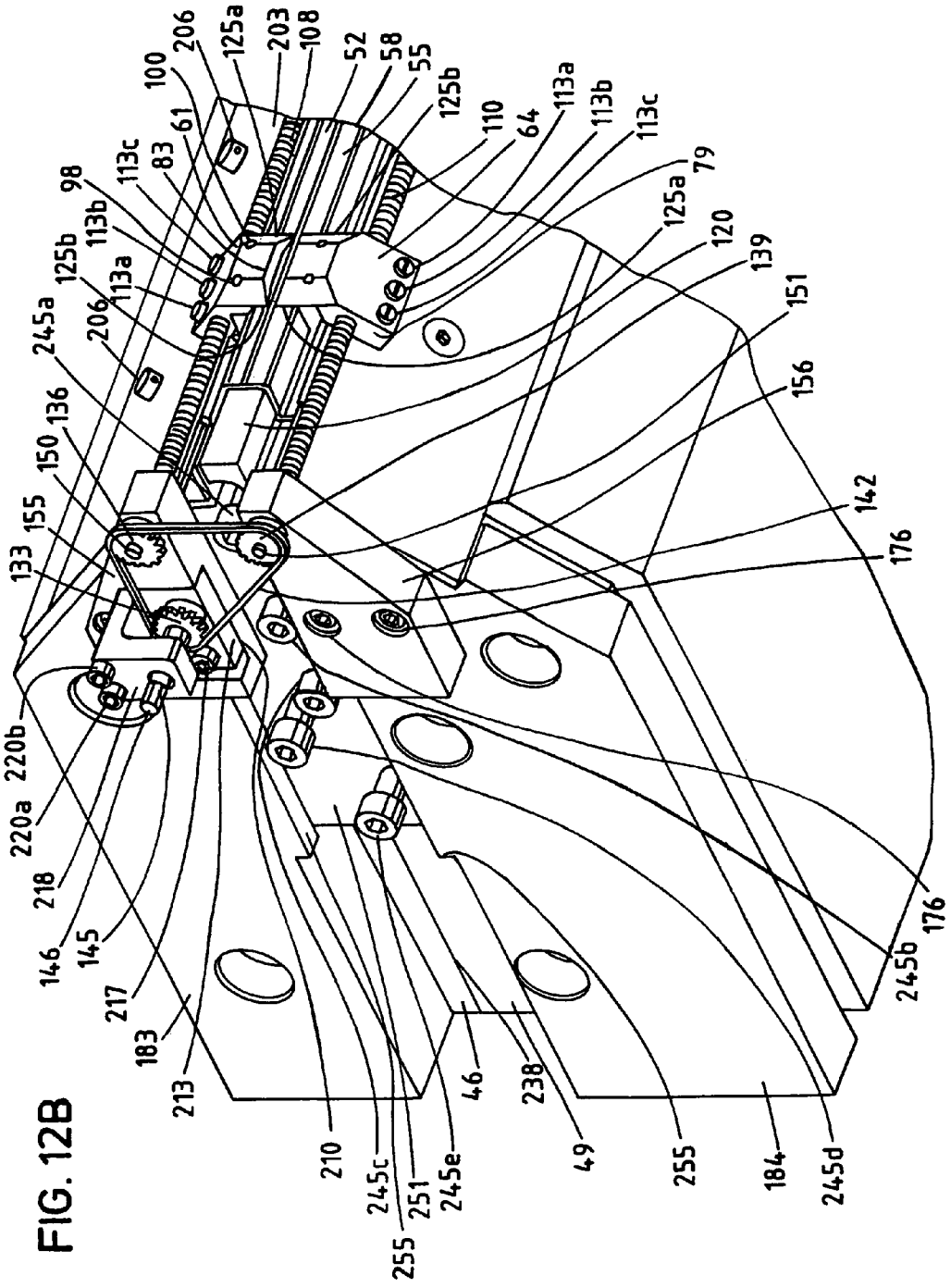
FIGS. 12B and 12C are enlarged, fragmentary, isometric views of the extrusion die of FIG. 1 looking from below.
Figure 12C:
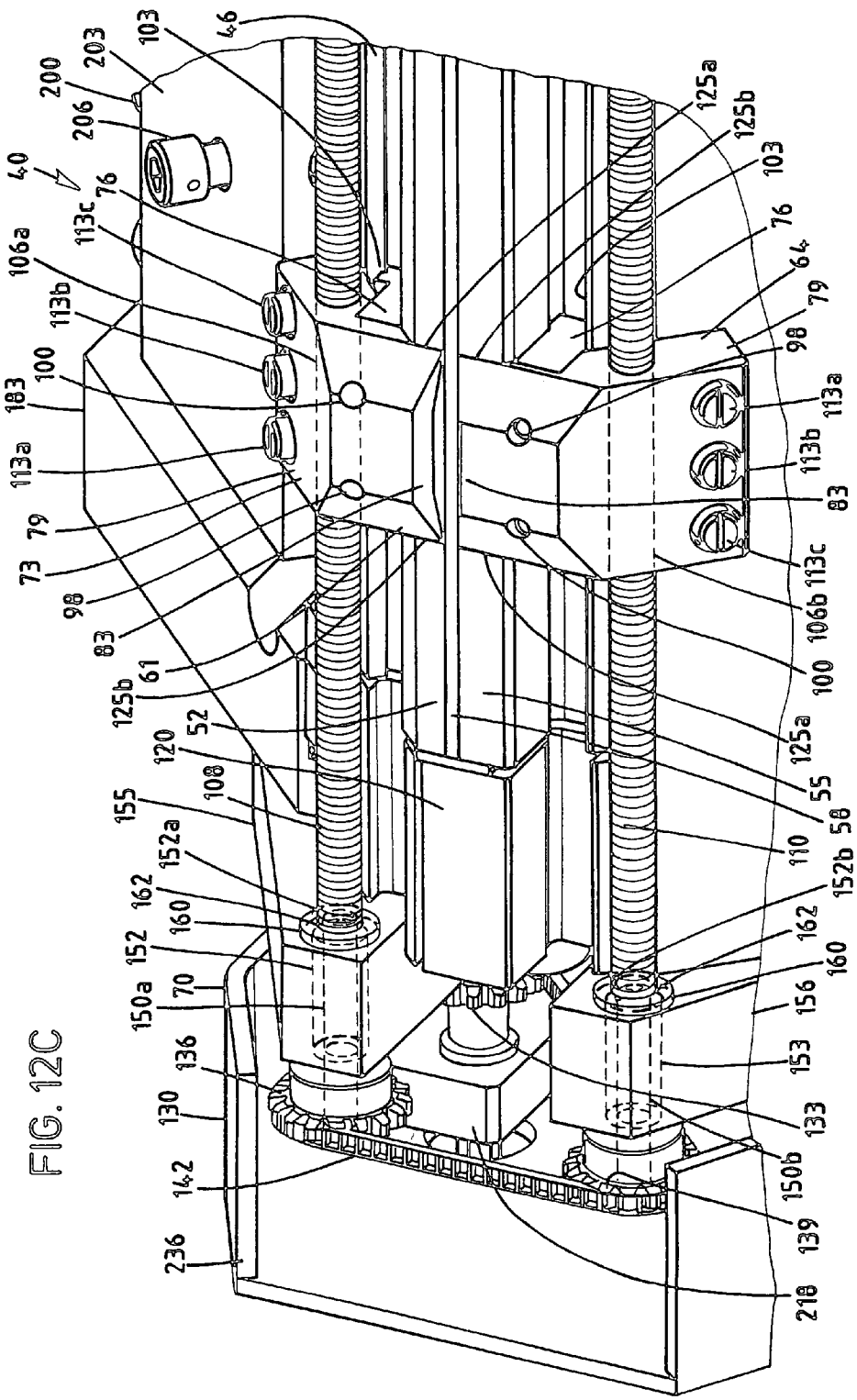
Figure 12D:
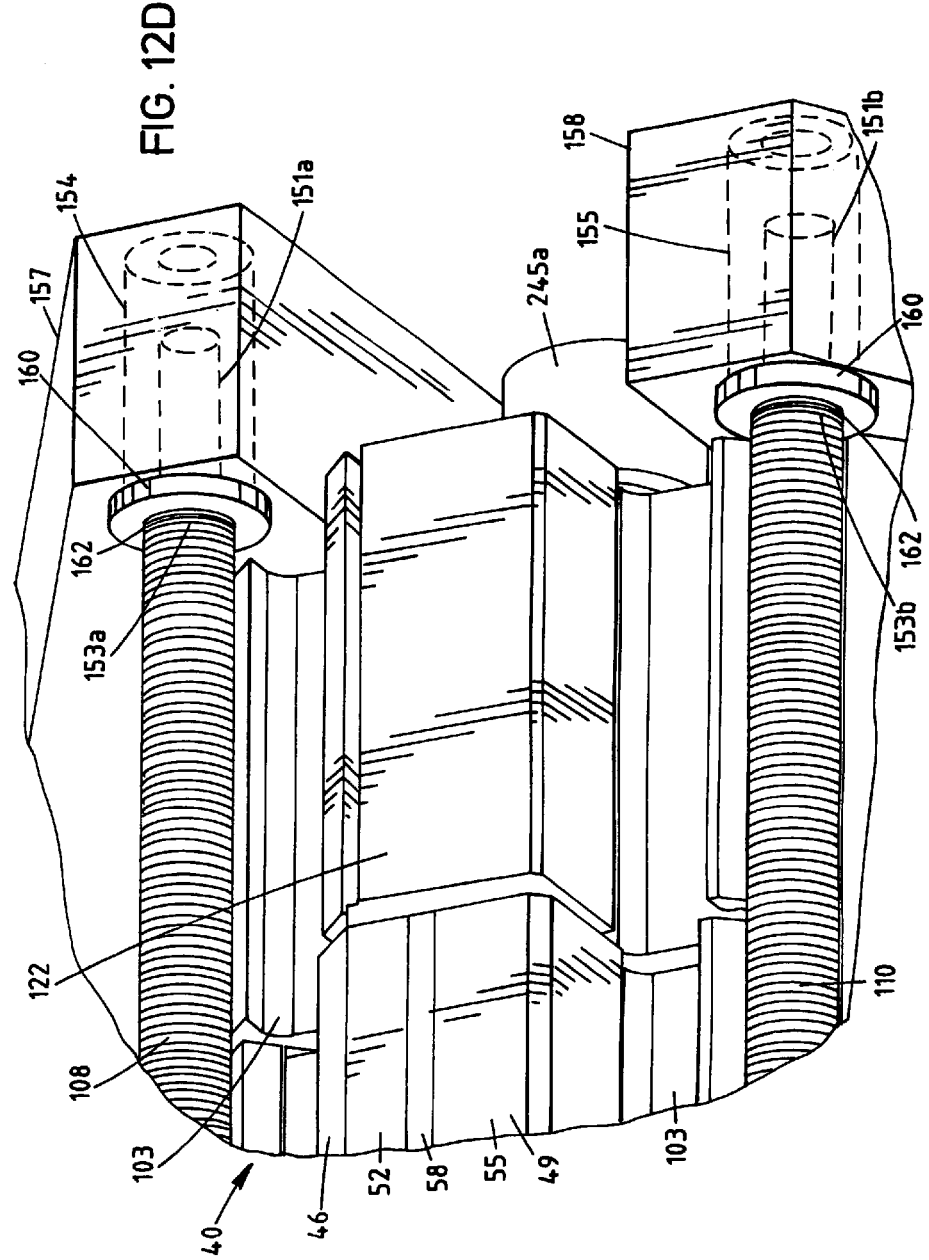
FIG. 12D is an enlarged, fragmentary, isometric view of the extrusion die of FIG. 1 looking from below and illustrating a side of the die opposite the chain housing.

Referring to FIGS. 12C and 12D, the ends 150a, 150b, 151a, 151b are disposed within collared sleeves 152, 153, 154, 155, respectively. The sleeves 152–155 are press-fitted into bores in mounting plates 155, 156, 157, 158, respectively. Each of the sleeves 152–155 includes a collar member 160. If necessary, a shim washer 162 is captured in abutment between each of the collar members 160 and the rod shoulders 152, 153 to take up any space therebetween. The rods 108, 110 are thus captured between the mounting plates 153, 156 and the mounting plates 163, 166 to prevent substantial longitudinal movement of the rods 108, 110. At the same time, the sleeves 152–155 act as bearings to permit rotation of the rods 108, 110 therein.

As seen in FIG. 12C, the ends 150a, 150b extend through the mounting plates 155, 156. The sprocket 136 is fitted to the end 150a (FIG. 12), and the sprocket 139 is fitted to the end 150b in any suitable manner. For example, each of the rods 108, 110 could be keyed to the respective sprocket 136, 139 and setscrews (not shown) could hold the sprockets 136, 139 on the rods 108, 110.

Bolts 176 (FIGS. 1, 12A) secure each of the mounting plates 153, 156, 163, 166 to first through fourth endplates 183–186, respectively. Bolts 180 (seen in FIG. 1 only)

secure the endplates 183, 185 to the die body 46 and the endplates 184, 186 to the die body 49.

In operation, rotating the drive shaft 145 in a first direction rotates the rods 108, 110, engaging threads of the rods 108, 110 with the threads 111 of the bores 106 of each scraping assembly 61, 64 so that the assemblies 61, 64 traverse along the rods 108, 110 from the first docking station 120 (FIG. 1) to the second docking station 122. During this movement, scraping of debris from the die lips 52 and 55 is accomplished primarily by the scraping edge 125a of the assembly 61 and the scraping edge 125b of the assembly 64 because these scraping edges first contact any built-up debris present on the die lips 52, 55, respectively. Conversely, rotating the drive shaft 145 (and the associated rods 108, 110) in an opposite direction moves the assemblies 61, 64 from the second docking station 122 to the first docking station 120 such that the opposite scraping edges (e.g., the edge 125b of the assembly 61) contact any built-up debris. If desired, a vacuum hose (not shown) could be disposed adjacent the scraping edges 125 to collect debris scraped off of the lips 52, 55. Also, a wiping device, such as a moistened squeegee (not shown), could be affixed adjacent each of the scraping edges 125 to further clean the lips 52, 55 after the scraping edges 125 have scraped debris. Although the assemblies 61, 64 do not significantly obstruct the outlet 58 while traversing across the respective lips 52, 55, the assemblies 61, 64 are maintained at either of the docking stations 120, 122 to ensure that the assemblies 61, 64 are kept clear of the outlet 58. Moving the lip scraping assemblies 61, 64 as described above allows a user to clean the die lips 52, 55 in a controlled manner, with application of constant pressure from the scraping edges 125. This is an advantage compared to manually scraping the lips 52, 55 which can be difficult, time-consuming, and less precise than using the scraping assemblies 61, 64. In addition, scraping by hand can be cumbersome and possibly unsafe if nip rolls (not shown) have been placed close to the outlet 58 to pull the flat sheet therefrom.

Repeated usage of the lip scraping assemblies 61, 64 may result in wear of the scraping edges 125a, 125b, which over time can reduce the scraping ability of the assemblies 61, 64. One might overcome this problem by removing the scraping assemblies 61, 64 from the rods 108, 110 and sharpening the scraping edges 125. Alternatively, one could replace the scraping assemblies 61, 64 entirely. However, removing the assemblies 61, 64 for sharpening or replacement would require the inconvenience of removing the mounting plates 157, 158 (FIG. 1).

Figure 8A:
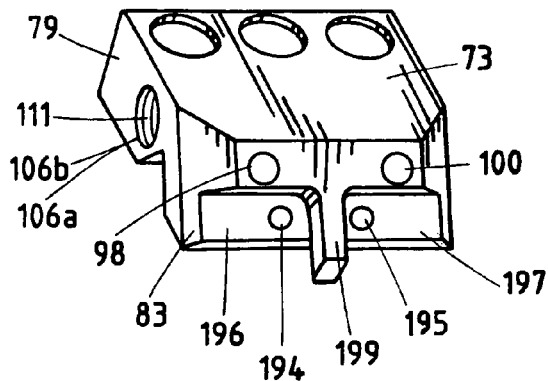
FIG. 8A–8C are isometric views of an alternate embodiment of a scraping assembly having removable scraping inserts.
Figure 8B:
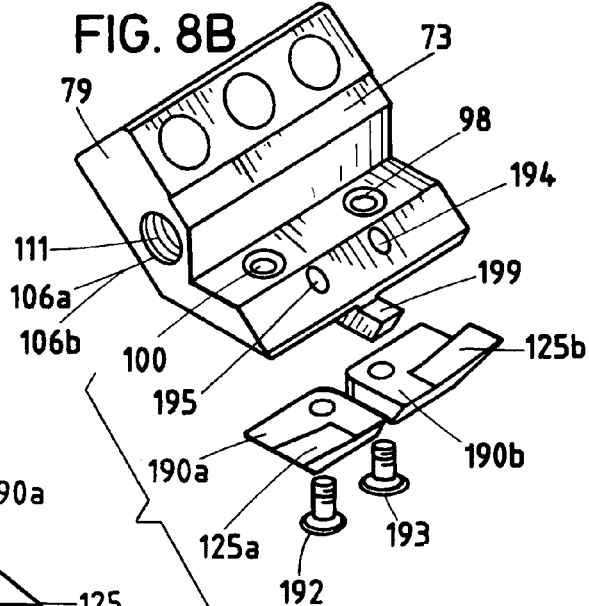
Figure 8C:
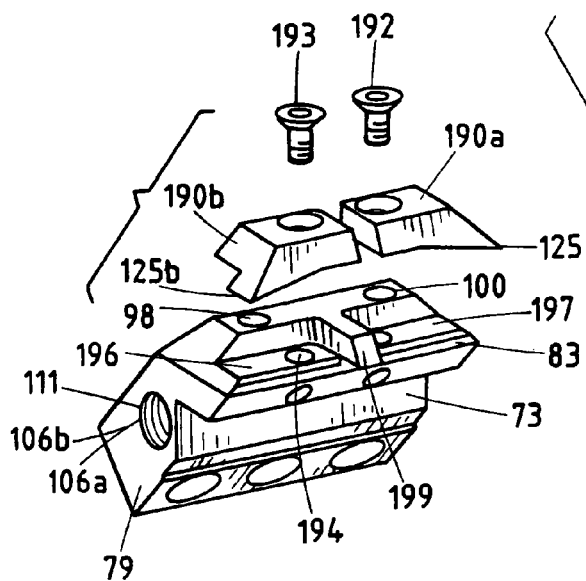
Figure 8D:
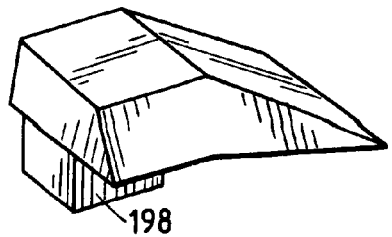
FIG. 8D is an alternate embodiment of scraping insert incorporating a press fit member.

FIGS. 8A–8C illustrate removable and replaceable scraping inserts 190a, 190b that may be easily replaced while the assemblies 61, 64 are docked at the docking station 120 or 122. The inserts 190 are attached to the body member 73 in any suitable manner such as by threaded bolts 192, 193. The bolts 192, 193 extend into threaded bores 194, 195 of first and second recesses 196, 197 that are defined by the scraping end 83. The inserts 190 may alternatively attach to the scraping end 83 by a press fit member 198 (FIG. 8) that is press-fitted within a complementary female portion (not shown) disposed in the scraping end 83. The scraping end 83 further defines a partition member 199 that restricts movement of the inserts 190 when the scraping edges 125 encounter resistance from debris on the die lips 52, 55. It should also be noted that while first and second inserts 190a, 190b are illustrated, a single replacement insert (not shown) could alternatively be provided.

Figure 10:
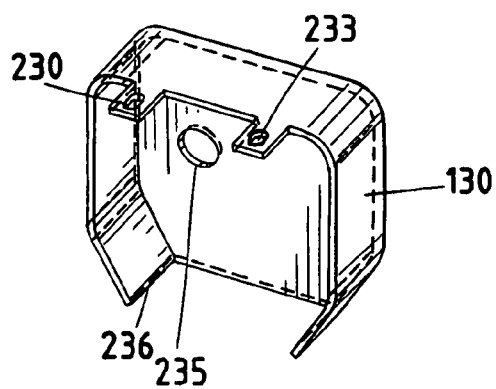
FIG. 10 is an isometric view of the chain housing.

Any or all of a plurality of bolts 200 (FIGS. 11, 12A), disposed on the first die body 46, may be rotated to bend the die lip 52 slightly toward or away from the die lip 55, thereby slightly changing the size of the die outlet 58 to optimally regulate flow of the extrudate from the outlet 58. A cover plate 203 covers the bolts 200 and is secured to the die body 46 by bolts 206. Because the mounting plate 153, the rod 108, and the sprocket 136 are all movable with the die lip 52, tension in the chain 142 may be affected by adjustment of the bolts 200. Partly for this reason, the mounting plate 153 includes a recess 210 (FIGS. 12A, 12B), in which a slide block 213 is disposed. The slide block 213 includes slots 214a, 214b (FIG. 12A). Adjustment is accomplished by loosening bolts 215 and 217, sliding the slide block 213 toward or away from the sprockets 136, 139, and then re-tightening the bolts 215, 217. The recess 210 is of sufficiently large size to allow for such adjustment. A further reason for providing the movable slide block 213 is to facilitate disassembly of the drive assembly 70 and removal of the scraping assemblies 61, 64 for maintenance and/or any necessary replacement of parts. A still further reason for providing the movable slide block 213 is so that a longer chain may be provided and the drive shaft 145 may be moved farther away from nip rolls (not shown), adjacent the die outlet 58. This would create more room for adjustment if a bidirectional motor (not shown) were affixed to the drive shaft 145. A bracket 218, having a bore through which the drive shaft 145 extends, is secured to the slide block 213 by threaded bolts 220a, 220b. The mounting plate 153 includes a button-head screw 225 (FIG. 12A), and the plate 156 likewise includes a button-head screw 227 (FIG. 12A). The screws 225, 227 are disposed in bores 230, 233 (FIG. 10) of the housing 130 to secure the housing 130 around the sprockets 133, 136, 139 and the chain 142. The housing 130 also includes a bore 235 that allows access to the drive shaft 145. The housing 130 further includes a recess 236 that allows access to the chain 142 without removal of the housing 130, thereby allowing for easy lubrication of the chain 142.

Figure 11:
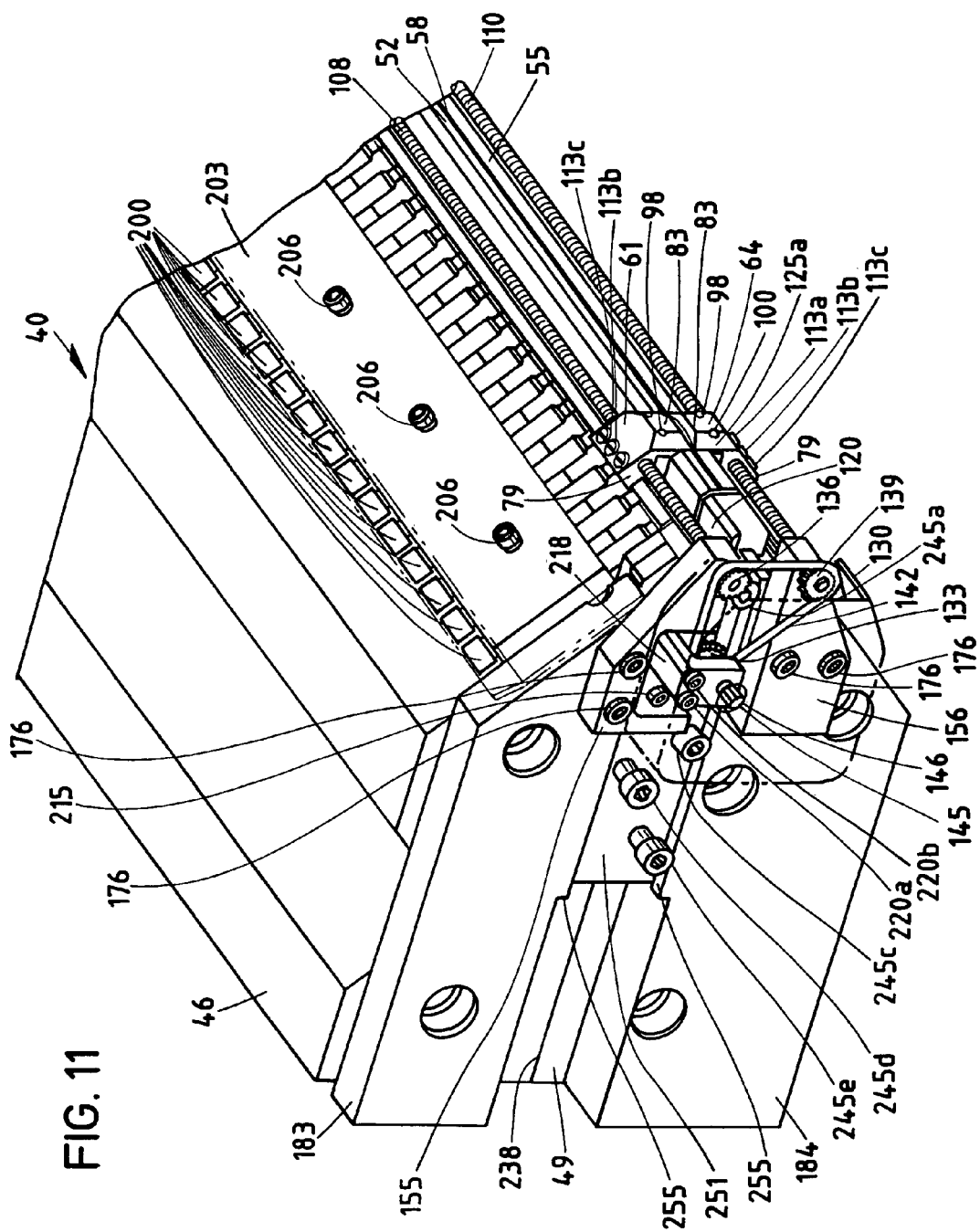
FIG. 11 is an enlarged, fragmentary, isometric view of the extrusion die of FIG. 1 with portions of the chain housing and cover plate broken away.

The die bodies 46, 49 are joined at a joint 238 (FIGS. 1, 11, 12). Because it is undesirable to have thermoplastic material possibly leak from the joint 238, a gasket 241 (FIG. 12A) is provided on opposite sides of the die 40. Threaded bolts 245a–e are disposed in first and second push plates 248, 251 (FIGS. 1, 12). Tightening the bolts 245 causes the push plates 248, 251 to bear against shoulders 255 of the end plates 183–186, while the ends (not shown) of the bolts 245 push intermediate plates 258, which in turn seals the gaskets 241 along the joint 238. The gaskets 241 are preferably made of GYLON® material. The gaskets 241 are available from Packaging Specialists of Appleton, Wis. However, the gaskets 241 could be replaced with any other suitable commercially available gasket made of different material.

FIGS. 14–17 illustrate a second embodiment of lip scraping assembly and die body wherein common elements are given like reference numerals. In the embodiment of FIGS. 14–17, the first die body 46 is replaced by a die body 260 having a channel 263, similar to the channel 103. However, the channel 263 includes a groove 266. The guide member 76 is replaced by a guide member 270 having a notch 273 formed therein, thereby creating protrusions 276 and 279. The protrusion 276 rides within the groove 266, thereby retaining the guide member 270 within the channel 263. It should be even more evident from the foregoing, as noted previously, that the guide member and the channel can have any cooperating shape(s) to slidably retain the guide member within the channel.

FIGS. 18–21 illustrate a further alternative embodiment for traversing lip scraping assemblies. As before, elements common to the various embodiments are given like reference numerals. The rod 108 is replaced by a steel cable 300 movable along first through fourth pulleys 303–306. The rod 110 may also be replaced with a similar cable (not shown) carried by identical pulleys (not shown) disposed on the second die body 49. Each of the pulleys 303–306 is secured to the die body 46 by slide brackets 309a–309d, respectively. Each of the slide brackets 309a–309d includes slots 312a, 312b. Bolts 315a, 315b are disposed in the slots 312 to enabling adjustment of tension in the cable 300. Adjustment may become necessary when the first lip 52 is bent by one or more threaded bolts (not shown) identical to the bolts 200 (seen in FIGS. 11, 12A). A bidirectionally rotatable winch 320 is disposed within a bracket 325. The bracket 325 is secured to the first die body 46 by bolts 328–331. The cable 300 is wrapped around the winch 320 at least one turn. When the winch 320 is rotated in a first direction, a lip scraping assembly 340 (similar to the assemblies 61, 64) is moved by the cable 300 toward the pulley 303. However, turning the winch 320 in an opposite direction moves the lip scraping assembly 340 toward the pulley 305. The lip scraping assembly 340, as illustrated, includes first and second canting screws 343a, 343b and locking screws 346, 347 that abut the cable 300. The locking screws 346, 347 are tightened to lock the assembly 340 on the cable 300.

INDUSTRIAL APPLICABILITY

The preceding embodiments are applicable to cleaning debris, such as hardened thermoplastic, off of the die lips of an extrusion die. This prevents die lines or other irregularities from forming in the extruded product.

Numerous modifications to the present invention will be apparent to those skilled in the art in view of the foregoing description. For example, the channel 103 could be formed within a structure (not shown) that is external of the die, and the guide members 76 could be situated on an opposite side of the body member 73 to fit within such a channel. In addition, if more than one scraping assembly is used, as illustrated in FIG. 1, each of the scraping assemblies need not be identical. Accordingly, this description is to be construed as only illustrative or exemplary of the claimed invention and is presented for the purpose of enabling those skilled in the art to make and use the invention and to teach the best mode of carrying out same. The exclusive rights to all modifications which come within the scope of the appended claims are reserved.

We claim:

1. An extrusion die, comprising a die body having a lip, wherein a scraping surface is pressed against the lip, and wherein the scraping surface is propelled along the lip by a moving assembly, and wherein the scraping surface extends from a first end of a scraping assembly and an adjustable biasing member is disposed at a second end of the scraping assembly, and wherein the scraping surface is pressed against the lip by the adjustable biasing member.

2. The die of claim 1, wherein the scraping surface is removable.

3. The die of claim 1, wherein the scraping surface is replaceable.

4. The die of claim 1, wherein the scraping assembly is adapted to be moved along a rod, and wherein the adjustable biasing member comprises a canting screw.

5. The die of claim 1, wherein the scraping assembly is adapted to be moved by a cable, and wherein the adjustable biasing member comprises a canting screw.

6. The die of claim 4, wherein the canting screw includes a rounded surface biased by a compression spring.

7. The die of claim 6, wherein a guide member extends from the scraping assembly and is disposed in a channel of the die adjacent the lip and wherein the channel and the guide member have cooperating shapes such that the guide member is slidably retained within the channel.

8. The die of claim 7, wherein the channel and the guide member have dissimilar shapes.

9. The die of claim 7, wherein the channel and the guide member have similar shapes.

10. The die of claim 9, wherein the channel and the guide member are T-shaped.

11. A scraping apparatus for scraping a lip of an extrusion die comprising a scraping surface adapted for scraping the lip when the scraping surface is pressed against the lip, wherein the scraping surface extends from a first end of a body, and wherein the scraping surface may be pressed against the lip by an adjustable biasing member disposed in a second end of the body and propelled therealong by moving apparatus.

12. The apparatus of claim 11, wherein the scraping surface is removable.

13. The apparatus of claim 11, wherein the scraping surface is replaceable.

14. The apparatus of claim 11, wherein the scraping surface includes first and second scraping edges and wherein each of the edges may be pressed against the lip.

15. The apparatus of claim 11, wherein the body is movable along a rod, and wherein the adjustable biasing member comprises a canting screw.

16. The apparatus of claim 11, wherein the body is movable by a cable, and wherein the adjustable biasing member comprises a canting screw.

17. The apparatus of claim 15, wherein a guide member extends from the body and is disposed in a channel of the die.

18. The apparatus of claim 17, wherein the channel and the guide member have cooperating shapes such that the guide member is slidably retained within the channel.

19. The apparatus of claim 18, wherein the channel and the guide member have dissimilar shapes.

20. The apparatus of claim 18, wherein the channel and the guide member have similar shapes.

21. The apparatus of claim 20, wherein the channel and the guide member are T-shaped.

22. An assembly for an extrusion die, comprising:
a guide member disposed in a channel of the die;
a scraping surface pressed against a lip of the die;
a rod connected to the die wherein the scraping surface is movable therealong; and
a drive shaft capable of rotating the rod to move the scraping surface along the rod;
wherein the scraping surface extends from a first end of a body and is pressed against the lip by a canting screw disposed in a second end of the body.

23. The assembly of claim 22, wherein the scraping surface is removable.

24. The assembly of claim 22, wherein the scraping surface is replaceable.

25. The assembly of claim 22, wherein the canting screw is biased by a compression spring.

26. A lip scraping assembly for scraping a lip of an extrusion die, the lip scraping assembly comprising a body pivotable about a fulcrum, a scraping surface carried by the body on a lip side of the fulcrum, and an adjustable biasing member disposed on another side of the fulcrum, wherein the scraping surface is adapted for scraping the lip when the scraping surface is pressed against the lip by the adjustable biasing member and propelled by a moving assembly along the lip.

27. The lip scraping assembly of claim 26, wherein the scraping surface is removable from or attachable to the scraping assembly by threaded bolts.

28. The lip scraping assembly of claim 26, wherein the scraping surface is removable from or attachable to the scraping assembly by a press fit member.

29. A scraping assembly adapted for use with a die having a die lip, the scraping assembly comprising:
  a scraping surface pivotally disposed on one side of a fulcrum;
  a biasing member disposed on an opposite side of the fulcrum; and
  a drive assembly adapted to move the scraping assembly along the die lip;
  wherein the scraping surface is pivotally biased against the die lip with the biasing member.

30. The scraping assembly of claim 29, wherein the biasing member is adjustable between a plurality of biasing forces.

31. The scraping assembly of claim 29, wherein the drive assembly comprises a threaded rod.

32. The scraping assembly of claim 29, wherein the drive assembly comprises a cable.

33. The scraping assembly of claim 29, wherein the adjustable biasing member comprises a canting screw.

34. The scraping assembly of claim 33, wherein the adjustable biasing member further comprises a spring.

35. The scraping assembly of claim 29, wherein the scraping surface comprises a scraping member removably attached to a body of the scraping assembly.

36. The scraping assembly of claim 35, wherein the scraping member has first and second beveled edges adapted to scrape the die lip and a recess facing the die lip disposed between the first and second beveled edges.

37. The scraping assembly of claim 35, wherein the scraping member is bolted to the body.

38. The scraping assembly of claim 35, wherein the scraping member is press fit to the body.

39. The scraping assembly of claim 29, wherein the fulcrum comprises a guide member.

40. The scraping assembly of claim 39, wherein the guide member is adapted to slideably engage a guide slot in the die.

* * * * *